(12) United States Patent
LaVigne et al.

(10) Patent No.: US 8,666,682 B2
(45) Date of Patent: Mar. 4, 2014

(54) ROTATIONAL TORQUE MEASUREMENT DEVICE

(75) Inventors: Paul A. LaVigne, Hancock, MI (US); Daniel R. Kemppainen, Calumet, MI (US); Glen L. Barna, Houghton, MI (US)

(73) Assignee: Michigan Technological University, Houghton, MI (US)

(*) Notice: Subject to any disclaimer, the term of this patent is extended or adjusted under 35 U.S.C. 154(b) by 373 days.

(21) Appl. No.: 12/837,253

(22) Filed: Jul. 15, 2010

(65) Prior Publication Data
US 2011/0015878 A1    Jan. 20, 2011

Related U.S. Application Data

(60) Provisional application No. 61/225,834, filed on Jul. 15, 2009.

(51) Int. Cl.
*G01L 1/00*       (2006.01)

(52) U.S. Cl.
USPC .......................................................... 702/41

(58) Field of Classification Search
USPC ......... 702/41–44, 57, 183, 189, 193; 73/1.09, 73/64.49, 131, 650, 862.08, 862.194, 73/862.195, 862.321, 862.334
See application file for complete search history.

(56) References Cited

U.S. PATENT DOCUMENTS

| | | | | |
|---|---|---|---|---|
| 5,067,354 A | * | 11/1991 | Kawai | 73/862.328 |
| 5,734,108 A | * | 3/1998 | Walker et al. | 73/650 |
| 6,817,528 B2 | * | 11/2004 | Chen | 235/462.13 |

\* cited by examiner

*Primary Examiner* — Mohamed Charioui
(74) *Attorney, Agent, or Firm* — Michael Best & Friedrich LLP

(57) ABSTRACT

A device for measuring torque applied through a rotating member. A first torsion reference member is fixedly coupled to the rotating member at a first axial position and a second torsion reference member is fixedly coupled to the rotating member at a second axial position. A first detector detects the passage of the first torsion reference member past the first detector upon each full rotation of the rotating member and to generate a first signal upon each passage of the first torsion reference member. A second detector detects the passage of the second torsion reference member past the second detector upon each full rotation of the rotating member and to generate a second signal upon each passage of the second torsion reference member. A controller calculates a phase difference between the first signal and the second signal relative during rotation of the rotating member under a torsional load.

10 Claims, 7 Drawing Sheets

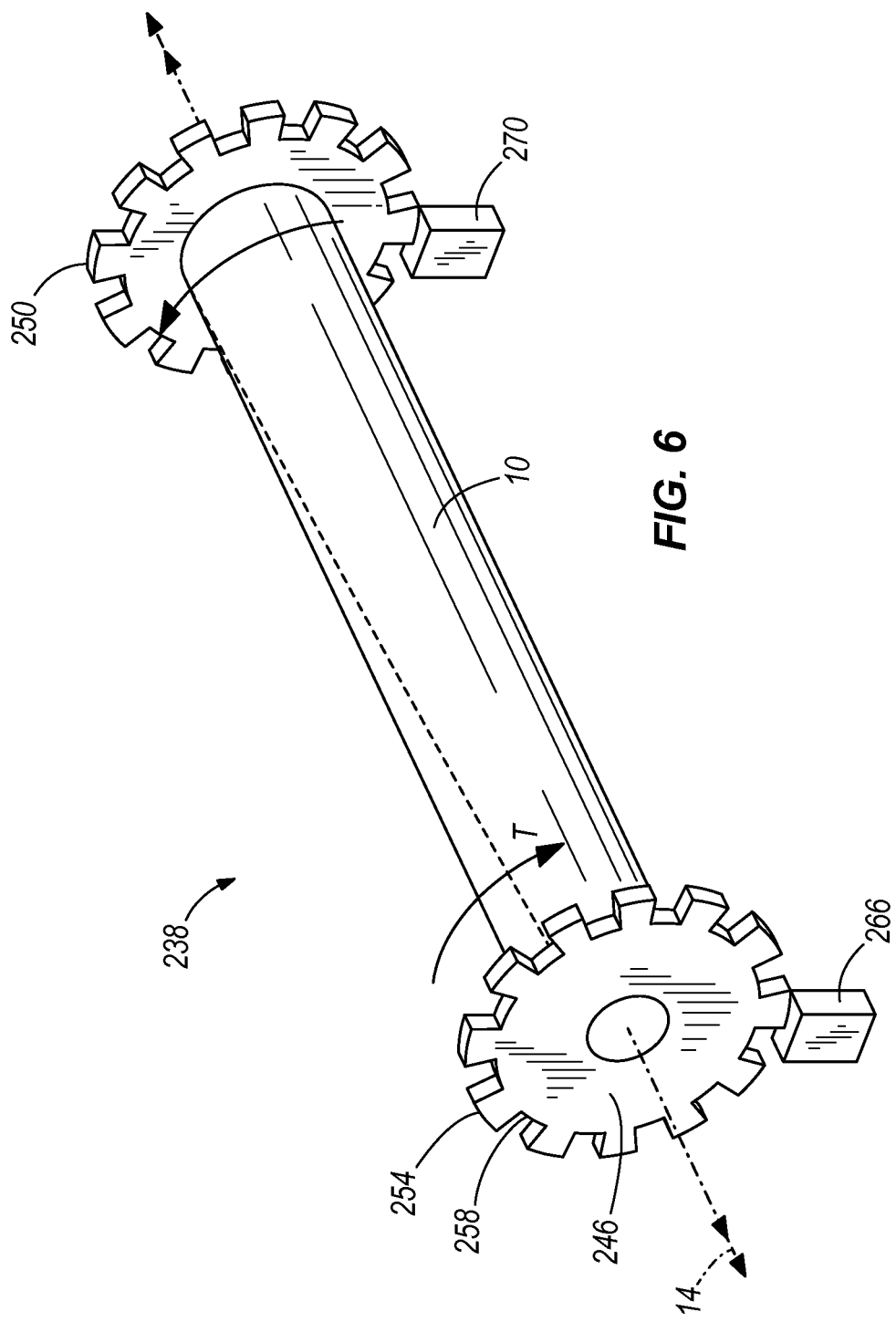

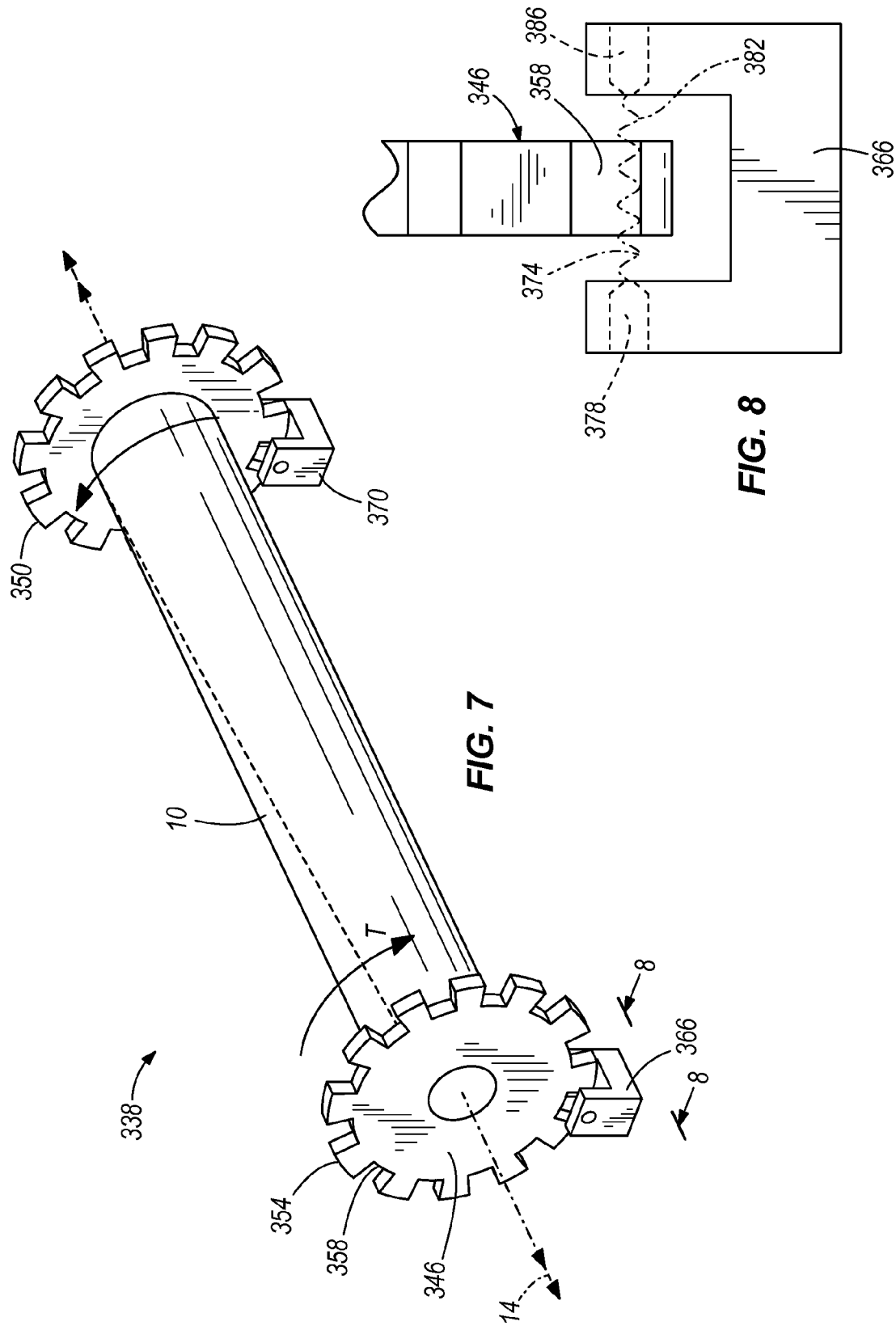

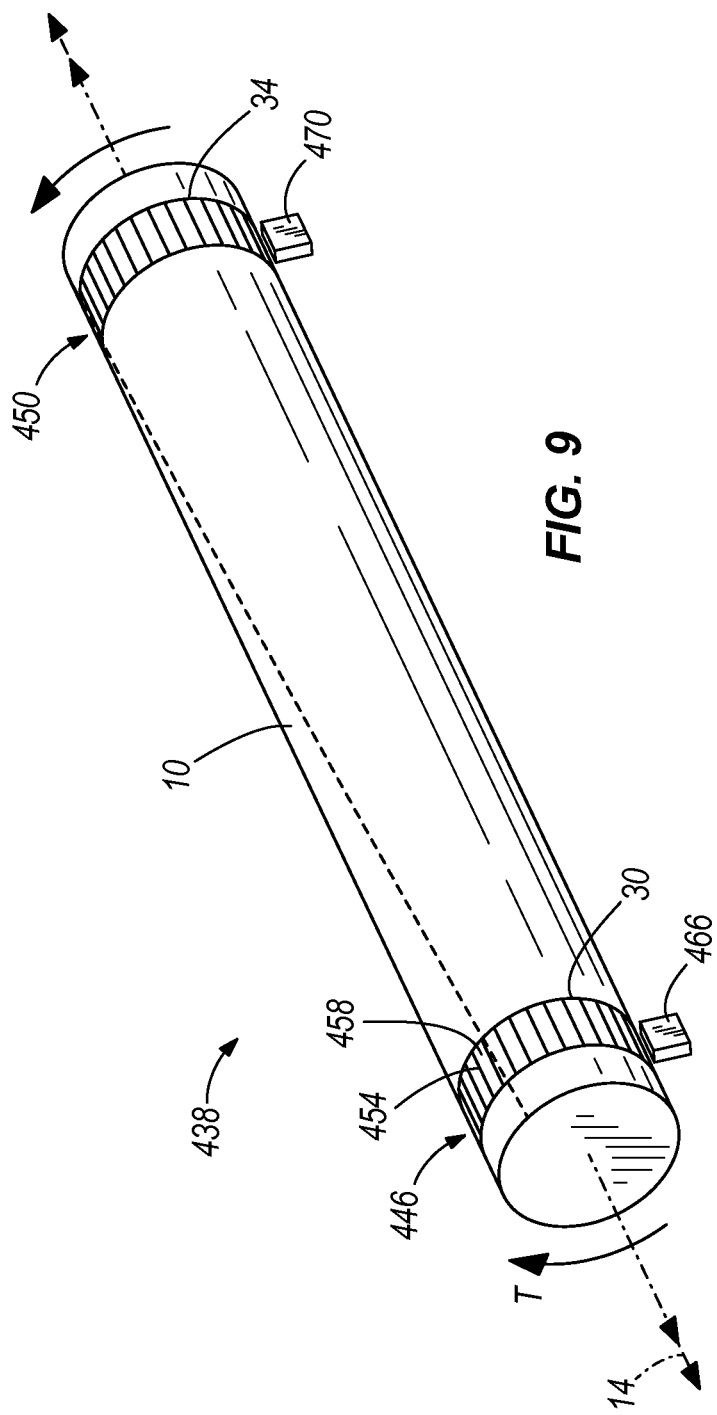

ROTATIONAL TORQUE MEASUREMENT DEVICE

This application claims priority to U.S. Provisional Patent Application No. 61/225,834, filed on Jul. 15, 2009, the entire content of which is incorporated herein by reference.

BACKGROUND

The present invention relates to a torque measurement device, and more particularly to a rotational torque measurement device with a reference member and detector.

Torque measurement devices typically utilize a torque transducer or sensor, which convert an applied torque into an electrical signal. A strain gauge is a torque transducer that converts applied torque into a change in electrical resistance. Typically, a strain gauge is attached to a deformable member, a torque is applied, and a change in electrical resistance is measured as the member deforms. The change in electrical resistance is converted into a torque measurement. Inertia of rotating components can cause measurement error. Additionally, due to their wires, such strain gauges are not applicable to rotating members.

SUMMARY

In one embodiment, the invention provides a device for measuring the torque applied through a rotating member rotating about a longitudinal axis, relative to a fixed member. The device includes a first torsion reference member fixedly coupled to the rotating member at a first axial position and a second torsion reference member fixedly coupled to the rotating member at a second axial position. A first detector is coupled to the fixed member and configured to detect the passage of the first torsion reference member past the first detector upon each full rotation of the rotating member and to generate a first signal upon each passage of the first torsion reference member. A second detector is coupled to the fixed member and configured to detect the passage of the second torsion reference member past the second detector upon each full rotation of the rotating member and to generate a second signal upon each passage of the second torsion reference member. A controller is configured to calculate a phase difference between the first signal and the second signal relative to a time reference during rotation of the rotating member under a torsional load. The controller compares the phase difference to a reference value and calculates a torque loading on the rotating member resulting from the torsional load based on the phase difference.

In another embodiment the invention provides a method of measuring torque applied through a rotating member rotating about a longitudinal axis relative to a fixed member. The method includes applying a torsional load to the rotating member. Rotation of the rotating member is detected at a first axial position and a first signal is generated. Rotation of the rotating member is detected at a second axial position and a second signal is generated. A loaded phase difference is calculated between the first signal and the second signal and compared to a reference value. A torque applied to the rotating member is calculated based at least upon the magnitude of loaded phase difference relative to the reference phase difference.

In yet another embodiment, the invention provides a system for calculating a torque load on a shaft. The system includes a first sensor generating a first signal in response to rotation of the first portion of the shaft and a second sensor generating a second signal in response to rotation of the second portion of the shaft. A processor compares the first signal to the second signal to arrive at a loaded phase difference between the first and second signals while the shaft is rotating under a load. The loaded phase difference is compared to a baseline phase difference. A twist in the shaft between the first and second portions of the shaft is calculated based on a difference between the loaded phase difference and the baseline phase difference.

Other aspects of the invention will become apparent by consideration of the detailed description and accompanying drawings.

BRIEF DESCRIPTION OF THE DRAWINGS

FIG. 6 is a perspective view of a shaft with a torque measuring device according to another aspect of the invention.

FIG. 7 is a perspective view of a shaft with a torque measuring device according to yet another aspect of the invention.

FIG. 8 is a side view of a first torsion reference member and a first detector of the torque measuring device of FIG. 7.

FIG. 9 is a perspective view of a shaft with a torque measuring device according to still yet another aspect of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
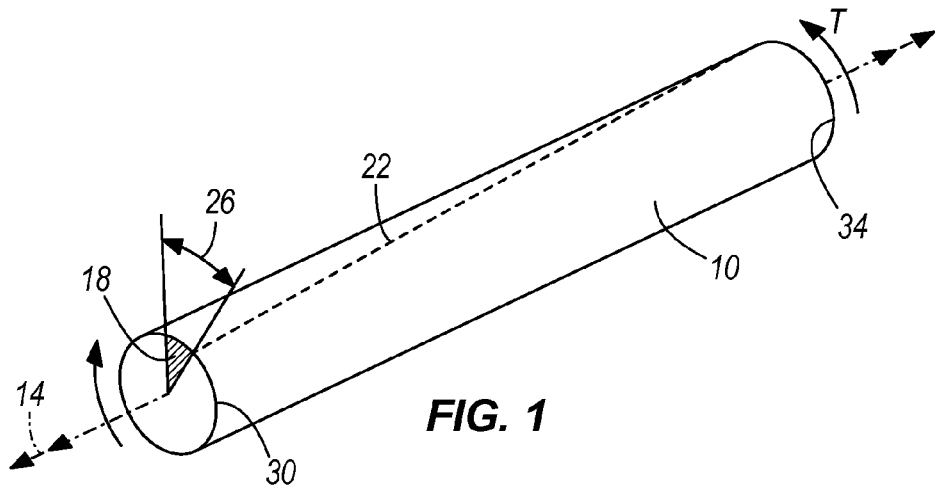
FIG. 1 is a perspective view of a shaft with an applied torque.

FIG. 1 is a perspective view of a shaft 10. The shaft 10 has a torque T applied about an axis 14, resulting in torsion illustrated generally at 18. Torsion is the twisting of an object due to an applied torque. As indicated by the reference line 22, the torsion 18 can be measured as an angular deformation 26 between a first axial position 30 (in this case, a first end) and a second axial position 34 (in this case, a second end). For a shaft of known mechanical characteristics, a magnitude of the applied torque can be calculated, derived or correlated by determining a change in torsion from a baseline or known value. As used herein, the torque T is not limited to numerical values expressed in the usual units of Newton-meters or foot-lbs, but may also express a comparative value from which the actual torque may be determined.

Figure 2:
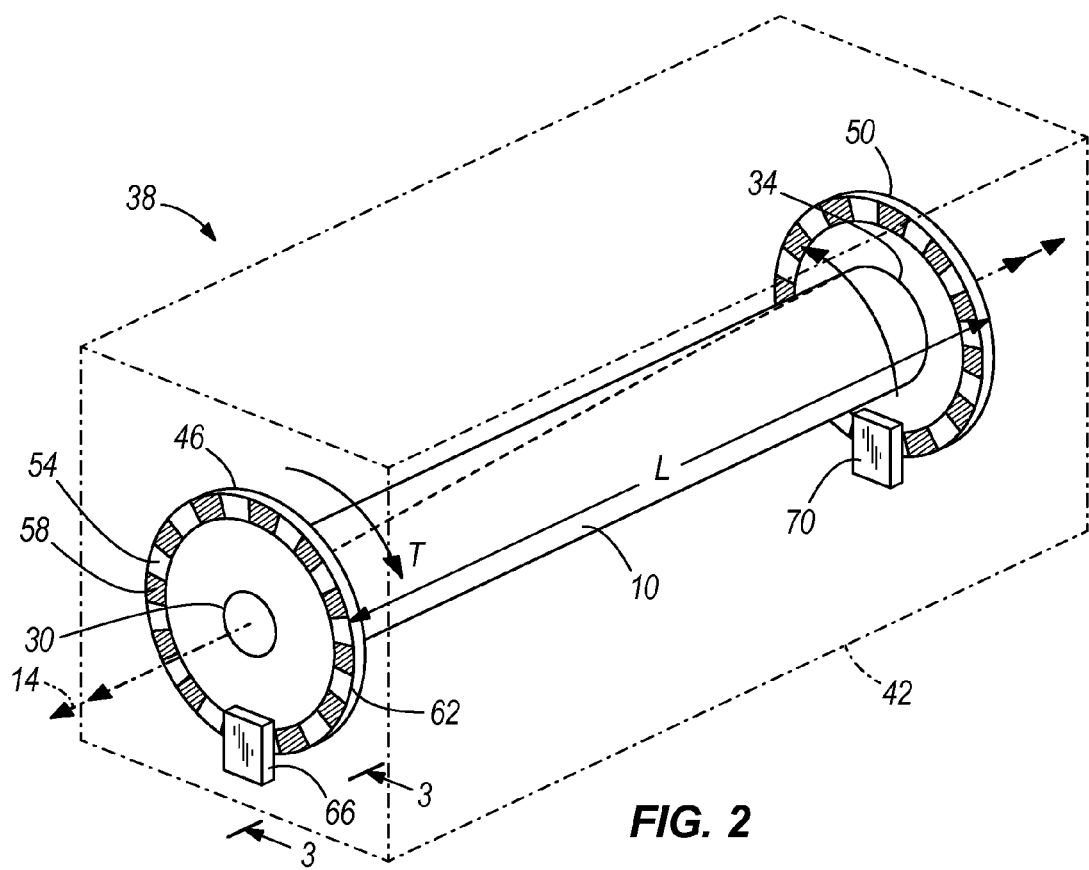
FIG. 2 is a perspective view of shaft with a torque measuring device according to one aspect of the invention.

FIG. 2 is a perspective view of the shaft 10 with a torque measurement device 38 according to one aspect of the invention. The shaft 10 is illustrated as being disposed within a fixed member 42. The shaft 10 may be a rotor, turbine shaft, drive shaft, power take off or other rotating member. The fixed member 42 may be, for example, a motor, engine, or transmission housing. The fixed member 42 may also be a radial or thrust bearing, or any other member fixed relative to a rotating member. The shaft 10 is rotatably supported by the fixed member 42 about the axis 14, for rotation with respect to the fixed member 42.

A first torsion reference member 46 is fixedly coupled to the shaft 10, for rotation with the shaft, at the first axial position 30. A second torsion reference member 50 is fixedly coupled to the shaft 10, for rotation with the shaft, at the second axial position 34. Although the torsion reference members 46 and 50 are illustrated as being located at first and second ends of the shaft, respectively, the torsion reference members can be placed anywhere along the shaft so long as a distance L between the reference members is known. In the embodiment of FIG. 1, each of the first torsion reference member 46 and the second torsion reference member 50 is a circular disk, though in other embodiments they may be triangular, square, star, or other polygonal shapes. The reference members 46 and 50 are oriented perpendicular to the axis 14, concentric with the axis. In the embodiment of FIG. 2, each reference member 46 and 50 includes a pattern of alternating light reflective areas 54 and light absorbing areas 58 arranged in a ring 62 concentric about the axis 14.

Figure 3:
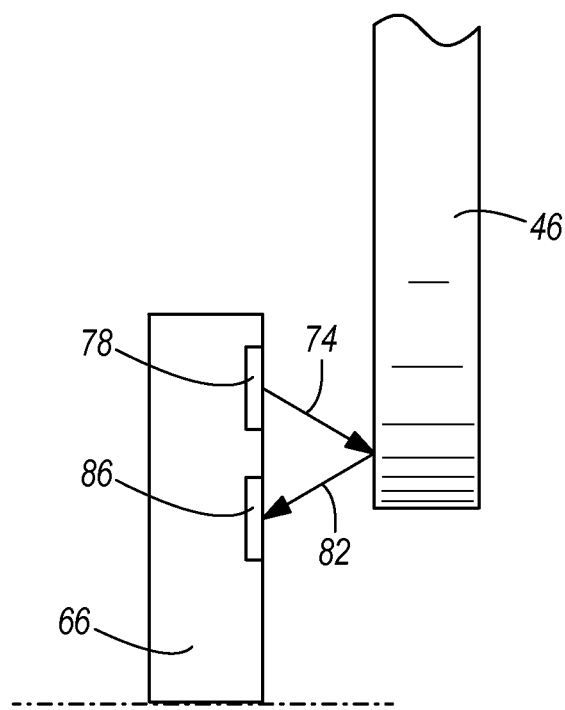
FIG. 3 is a side view of a first torsion reference member and a first detector of the torque measuring device of FIG. 2.

A first detector (i.e., sensor) 66 is coupled to the fixed member 42 adjacent the first reference member 46. A second detector 70 is coupled to the fixed member 42 adjacent the second reference member 50. The detectors 66 and 70 in the embodiment of FIG. 2 are optical and substantially identical. In other embodiments, the first detector and the second detector may differ in form or function. As shown in FIG. 3, the detector 66 emits an emitted light 74 from an emitter portion 78 against the reference member 46. The detector 66 receives reflected light 82 reflected off the reference member 46 at a receiver portion 86.

Each detector 66 and 70 receives reflected light 82 when a light reflective area 54 passes in front of the detector and does not receive reflected light when a light absorbing area 58 passes in front of the detector. In this regard, it is not important in the broader scope of the invention that the areas between the light reflective area 54 be light absorbing per se. In other embodiments, the light absorbing area 58 may be replaced with an area that is light reflecting, but is angled such that the reflected light 82 does not reach the receiver portion 86, and achieve the same purpose as the light absorbing area 58. In other embodiments, the light absorbing area 58 could be reflective, but light scattering (e.g., a many faceted surface) and achieve the same purpose as the light absorbing area 58. In some embodiments, the emitted and reflected light may be in the visible spectrum. In other embodiments, the light may be ultraviolet, infrared, or other ranges of the electromagnetic spectrum. The emitter portion may also be a laser. Similarly, the reflective areas and absorbing areas may be optimized for specific wavelengths of a corresponding detector.

Each detector 66 and 70 produces a signal with a first amplitude in response to receiving light at the receiver portion 86, and a second amplitude in response to receiving no light or light of insufficient intensity or brightness at the receiver portion 86 In some embodiments, the first amplitude may be "on" and the second amplitude may be "off," such that the detectors each generate a binary on-off signal in response to the alternating sequence of the pattern when the rotating member rotates. However, in other embodiments the signals could be sinusoidal, sawtooth, or have other waveforms. The first detector 66 generates a first signal, and the second detector 70 generates a second signal.

Figure 4:
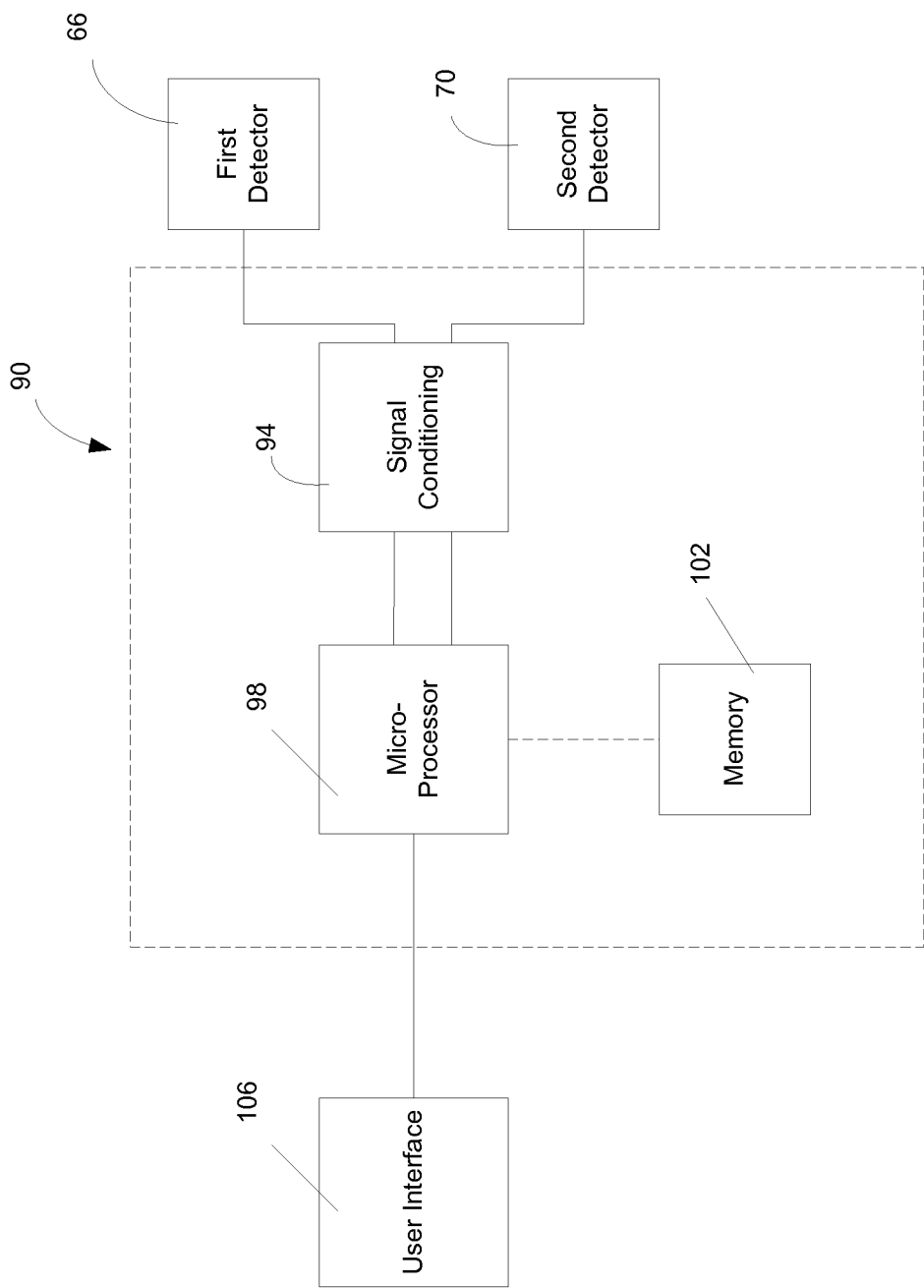
FIG. 4 is a block diagram of a controller of the torque measurement device of FIG. 2.

As illustrated in FIG. 4, signals from the first detector 66 and second detector 70 are received by a controller 90. In the illustrated embodiment, the detectors 66 and 70 are hardwired to the controller 90. In other embodiments, the first signal and/or second signal may be transmitted wirelessly to the controller. The signals received by the controller 90 may first be processed by a signal conditioning circuit 94 configured to filter or otherwise condition the raw signals from the detectors 66 and 70. After signal conditioning, the first signal and second signal are received by a micro-processor 98. The micro-processor 98 is configured to analyze the signals and determining the torque T. A memory module 102 is provided to store data, such as constants or baseline values which may be used by the micro-processor 98 as part of determining the applied torque T. The controller 90 may also receive inputs from and send outputs to additional sensors user inputs, or other user interfaces, indicated generally at 106. Examples of a user interface include a keyboard and display by which an operator may enter data related to the mechanical characteristics of the shaft.

Figure 5:
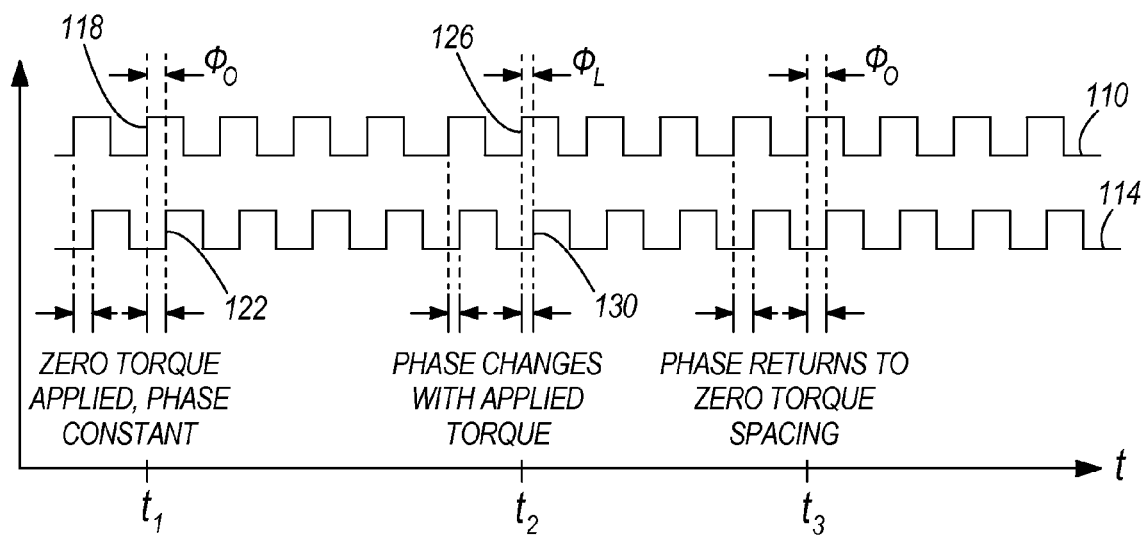
FIG. 5 is a graph comparing a signal generated by the first detector to a signal generated by the second detector of the torque measuring device of FIG. 2.

FIG. 5 is a graph comparing a representative first signal 110 and a representative second signal 114. In the illustrated embodiment, each of the first signal 110 and the second signal 114 is binary (i.e., "on" or "off"), with a square wave form. However, in other embodiments the signals could be sinusoidal, sawtooth, or have other waveforms that may require signal conditioning. It is the phase of the signals, rather than the amplitude or waveform, that is used to derive torsion and/or torque. Because the first signal 110 and second signal 114 relate to the same shaft, under steady-state conditions, and assuming that both reference members 46, 50 and detectors 66, 70 are identical, both signals will have the same frequency.

At any given time, the first signal 110 has a first phase, and the second signal 114 has a second phase. Comparing the first phase to the second phase with respect to the same time reference t results in a phase difference $\Phi$. A phase difference $\Phi$ may be expressed in terms of time or in terms of degrees.

When the rotating member rotates at steady state under known load, such as at time $t_1$, a baseline phase difference $\Phi_0$ between the first signal 110 and second signal 114 is constant. The baseline phase difference $\Phi_0$ may be a programmed constant value or an input determined by direct observation. Where the first reference member and second reference member have identical orientations relative to the shaft under a no load condition (i.e., zero torsion), the baseline phase difference $\Phi_0$ at $t_1$ will be zero. Regardless of how or when the baseline phase difference $\Phi_0$ is determined, it is later used by the controller as a comparative value for determining the applied torque T. Thus, any baseline value may be used, so long as the conditions under which it occurs are known. The baseline value is stored in memory 102.

When the applied torque T is applied to the rotating member (e.g., with a dynamometer or a prime mover) at a time $t_2$, the phase difference changes from $\Phi_0$ to a loaded phase difference $\Phi_L$. Based on additional inputs including the mechanical characteristics of the rotating member, the applied torque T can be calculated by comparing the loaded phase difference $\Phi_L$ to the baseline phase difference $\Phi_0$. The comparison may be expressed either as a difference or a ratio:

$\Phi_0 - \Phi_L$ = change in phase difference = $\Delta\Phi$ $\Phi_0/\Phi_L$ = phase difference ratio Either value may be used calculate the applied torque T since both the change in the phase difference or phase difference ratio relates to a change in torsion of the shaft. For a shaft of known mechanical characteristics, the applied torque T may be directly calculated from the torsion by well known mechanical principles. Measurement error is minimized since actual deformation, not including inertia affects, causes the change in phase difference. A speed of shaft rotation can be input from the motor that is rotating the shaft, or can be calculated based on a period of the first signal 110 or second signal 114.

The following example illustrates one method by which the controller 90 may calculate an applied torque T for a shaft rotating at a known instantaneous rotational velocity measured in revolutions per minute (RPM). The amount of time for each rotational degree to pass is calculated as follows:

1) Convert RPM to revolutions per second ("RPS")

(RPM/60)=RPS

2) Convert to degrees per second by multiplying by 360:

((RPM/60)*360)=Degrees per Second

3) Convert to seconds per degree:

(1/((RPM/60)*360))=Seconds per Degree

The baseline phase difference $\Phi_O$ is obtained by measurement or calculation. This baseline phase difference $\Phi_O$ may be measured, starting at t1, by obtaining a time from an edge 118 of the first signal 110 to a corresponding edge 122 of the second signal 114, if rotational velocity (RPM) is known. This baseline phase difference $\Phi_O$ may also be calculated by recording RPM, independent of rotational velocity, as a phase shift in degrees. The phase shift value can then be used to calculate a baseline phase difference $\Phi_O$ expressed in time using the known RPM of the shaft. Those of skill in the art will appreciate that shaft RPM can be determined by the controller 90 from either the first signal 110 or the second signal 114.

Next, the loaded phase difference $\Phi_L$ with the unknown applied torque T is measured starting at time t2. In this example, the loaded phase difference $\Phi_L$ is expressed in time rather than degrees. In this example, $\Phi_L$ is the time between an edge 126 of the first signal 110 to a corresponding edge 130 of the second signal 114.

Once $\Phi_L$ and $\Phi_O$ are determined, the change in the phase difference is calculated:

$\Phi_O - \Phi_L = \Delta\Phi$

Dividing the change in the phase difference $\Delta\Phi$ by seconds per degree provides the change in degrees of torsion due to the applied torque:

$\Delta\Phi$/(Seconds per Degree)=Degrees of Torsion

For a shaft of known mechanical characteristics, the degrees of torsion may be used to calculate, correlate, or derive the applied torque T applied to the shaft.

FIGS. 6-9 illustrate additional aspects of the invention embodied in alternative embodiments. Each of the embodiments of the invention disclosed herein shares the common principle of deriving a torque loading from the phase difference between a first signal generated by a first detector and a second signal generated by a second detector. Similar components have been given similar reference numerals, with different prefixes to distinguish the different embodiments.

FIG. 6 illustrates a second embodiment of a torque measurement device 238, in which a first reference member 246 and a second reference member 250 each take the form of notched or castellated disks. Solid protrusions, or teeth 254, of the reference members 246 and 250 protrude outwardly radially. The teeth 254 are separated by radial gaps 258. Each tooth 254 has a magnetic or electromagnetic characteristic distinguishable from the radial gaps 258. Each of a first detector 266 and a second detector 270 in this embodiment includes an electromagnetic sensor, such as an inductive element, or Hall effect sensor (not shown).

A Hall effect sensor is a transducer that varies its output voltage in response to changes in magnetic field. The Hall effect sensor may be combined with circuitry that allows the device 238 to act in a binary (on/off) mode. In this embodiment, signals generated by the first detector 266 and second detector 270 are similar to those illustrated in FIG. 5, and the controller 90 illustrated in FIG. 4 is applicable to the embodiment of FIG. 6. Where the signals are binary, the "on" signal is established when a tooth 254 passes by the detector 266 or 277, and the "off" signal is established when a gap 258 passes by the detector 266 or 277. This works due to a voltage difference that is created across the detector, transverse to an electric current in the detector and a magnetic field perpendicular to the detector. Polarization is reversed when a tooth 254 passes by the detector causing the magnetic field to reverse. The starting polarization is restored when a gap 258 passes by.

FIGS. 7-8 illustrate a third embodiment of a torque measurement device 338 in which a first reference member 346 and a second reference member 350 take the form of notched or castellated disks. As with the embodiment of FIG. 6, solid portions, or teeth 354, of the disks protrude outwardly radially. The teeth are separated by radial gaps 358, or "windows."

As illustrated in FIG. 8, each detector 366 (or 370) in this embodiment is an optical, line-of-sight detector. A light emitter 378 is positioned on one side of the reference member 346 and a light receiver 386 is positioned on the opposite side of the reference member. In this embodiment, an "on" signal is established when light 374 transmitted by the light emitter 378 passes through a gap 358 and is received at 382 by the light receiver 386. An "off" signal is established when the light 382 is interrupted by a tooth 354.

FIG. 9 illustrates a fourth embodiment of a torque measurement device 438. In this embodiment, a first reference array 446 and a second reference array 450 are substantially flush with the surface of the shaft 10. The reference arrays 446 and 450 are arranged circumferentially on the shaft 10 at the first axial position 30 and the second axial position 34, respectively. The reference arrays 446 and 450 include contrasting reference features 454 and 458. Examples of the contrasting reference features include grooves, ridges, permanent magnets, alternating light reflective and non-reflective areas or other features. It should be appreciated that while multiple reference features are illustrated for each reference member, some embodiments may only have one reference feature per reference member.

The embodiment of FIG. 9 includes a first detector 466 and a second detector configured 470 to detect passage of the reference feature(s) during rotating of the shaft 10. Where the reference feature has a magnetic characteristic, the corresponding first and second detectors 466 and 470 may include Hall effect sensors. Where the reference feature has optical characteristics, such as light reflective and light absorbing areas, the corresponding detectors 466 and 470 may include a light detector and light emitter, as described in the embodiment of FIGS. 2-3.

The invention is not limited to the embodiments illustrated and described above, and is capable of being embodied in any system that includes a reference member and a detector configured to detect passage of the reference member in order to generate a signal. In all illustrated embodiments, the reference members and detectors are configured to generate a signal that corresponds to a pattern of a changing condition such as light or a magnetic field. In the optical embodiments, the detectors include a receiver and the reference members include portions that change the amount of light (e.g., permit or prevent light, or change the intensity or amount of light)

that is received by the light receiver. In the magnetic embodiments, the reference members vary a magnetic field at the dectors.

Thus, the invention provides, among other things, a device and method for measuring torque in rotating machinery. Various features and advantages of the invention are set forth in the following claims.

What is claimed is:

1. A device for measuring the torque applied through a rotating member rotating about a longitudinal axis relative to a fixed member, the device comprising:
   a first torsion reference member fixedly coupled to the rotating member at a first axial position;
   a second torsion reference member fixedly coupled to the rotating member at a second axial position;
   a first detector coupled to the fixed member and configured to detect the passage of the first torsion reference member past the first detector upon each full rotation of the rotating member and to generate a first signal upon each passage of the first torsion reference member;
   a second detector coupled to the fixed member and configured to detect the passage of the second torsion reference member past the second detector upon each full rotation of the rotating member and to generate a second signal upon each passage of the second torsion reference member; and
   a controller configured to:
      calculate a phase difference between the first signal and the second signal relative to a time reference during rotation of the rotating member under a torsional load;
      compare the phase difference to a reference value; and
      calculate a torque loading on the rotating member resulting from the torsional load based on the phase difference,
   wherein the controller is configured to calculate the torque loading based upon a ratio of the phase difference and the reference value.

2. The device of claim 1, wherein the first torsion reference member includes a pattern that is sensed by the first detector; and wherein the pattern comprises gaps and protrusions.

3. The device of claim 1, wherein the first torsion reference member includes a pattern of reflective and non-reflective portions; and wherein the first detector comprises a light emitting portion and a light receiving portion for sensing the pattern of reflective and non-reflective portions.

4. The device of claim 1, wherein the first torsion reference member is integrally formed as one with the rotating member.

5. The device of claim 1, wherein the first torsion reference member comprises areas of a first texture and areas of a second texture on a surface of the rotating member; and wherein the first detector is configured to receive a light reflected off of the first texture.

6. The device of claim 1, wherein the first torsion reference member comprises a radial pattern of protrusions; and wherein the first detector senses the radial pattern.

7. The device of claim 1, wherein the reference value is a reference phase difference calculated under a known torsional load.

8. The device of claim 1, wherein the reference value is a reference phase difference calculated under a no-load condition.

9. The device of claim 1, wherein the reference value is a constant.

10. The device of claim 1, wherein the controller is configured to calculate the torque loading based upon a difference between the phase difference and the reference value.

* * * * *